May 18, 1965 E. LEGLER ET AL 3,184,545

SYNCHRONIZING SYSTEM PICKUPS WITH TELEVISION INTERCOMMUNICATION PROVIDED BY PHASE MODULATION OF REFERENCE PULSES

Filed April 17, 1962 3 Sheets-Sheet 1

Inventors:
Ernst Legler
Hubert Förster by Michael S. Striker
Attorney

Inventors:
Ernst Legler
Hubert Förster
by Michael S. Striker
Attorney

SYNCHRONIZING SYSTEM PICKUPS WITH TELEVISION INTERCOMMUNICATION PROVIDED BY PHASE MODULATION OF REFERENCE PULSES

Filed April 17, 1962 3 Sheets-Sheet 3

Jnventors:
Ernst Legler
Hubert Förster
by Michael S. Striker
Attorney 3,184,545

SYNCHRONIZING SYSTEM PICKUPS WITH TELEVISION INTERCOMMUNICATION PROVIDED BY PHASE MODULATION OF REFERENCE PULSES

Ernst Legler, Darmstadt, and Hubert Förster, Darmstadt-Eberstadt, Germany, assignors to Fernseh G.m.b.H., Darmstadt, Germany Filed Apr. 17, 1962, Ser. No. 188,159
Claims priority, application Germany, May 12, 1961, F 33,904
11 Claims. (Cl. 178—69.5)

Figure 1:
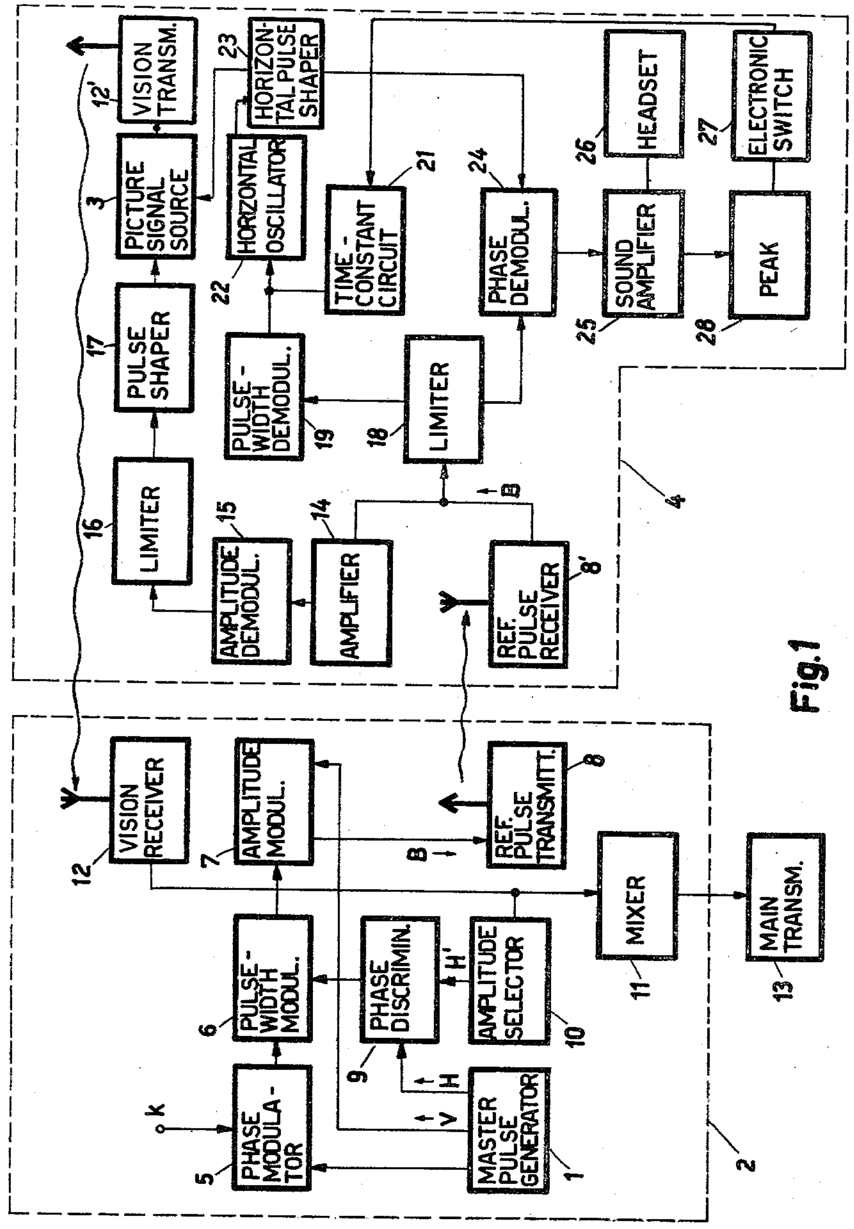

The present invention relates to a synchronizing system for television transmitting apparatus and is especially concerned with a method of synchronizing a television picture signal source situated at a remote position with a master pulse generator situated at a central position. This is done by transmitting a reference signal from the central position to the remote position. A phase discriminator located at the central position is fed with a train of signals from the local master pulse generator and with a train of signals from the remote position in order to measure the phase difference between corresponding signals of each signal train. A control voltage corresponding to said phase difference is generated and used to vary a characteristic value (parameter) of said reference signal in such a manner that the synchronizing signals transmitted from said signal source to said central position are held in synchronism with synchronizing signals developed by the master pulse generator. It is essential, that any variation of the length of the signal transmission path between said central position and said remote position which may occur during the transmission does not affect the synchronism.

It is an object of the present invention to improve the method and the apparatus by which said reference signal controls the phase of the picture signal.

It is another object of the present invention to improve the transmission of said reference signal from the central position to the remote position.

It is a further object of the present invention to avoid phase variations of picture signals arriving at said central position by radio link from a moving remote position.

An essential aspect of the present invention consists in transmitting additional information by the reference signal from the central position to the remote position.

With above objects in view a television transmitting apparatus according to the invention, comprises, in combination, a reference pulse generator generating reference pulses, a modulator modulating a plurality of characteristic parameters of said reference pulses e.g. the width, the phase or the amplitude; a phase discriminator generating a control voltage which modulates one of said characteristic parameters and a vertical synchronizing generator generating vertical synchronizing pulses which modulate another one of said characteristic parameters.

In a preferred embodiment of the present invention a reference pulse generator generates a train of rectangular pulses. The width of these pulses is modulated by the control-voltage of the phase discriminator, the amplitude is modulated by the vertical synchronizing information and the phase is modulated by a sound signal. This train of pulses generated at the central position is transmitted to the remote position as a modulation of a radio-frequency carrier wave.

Figure 2:
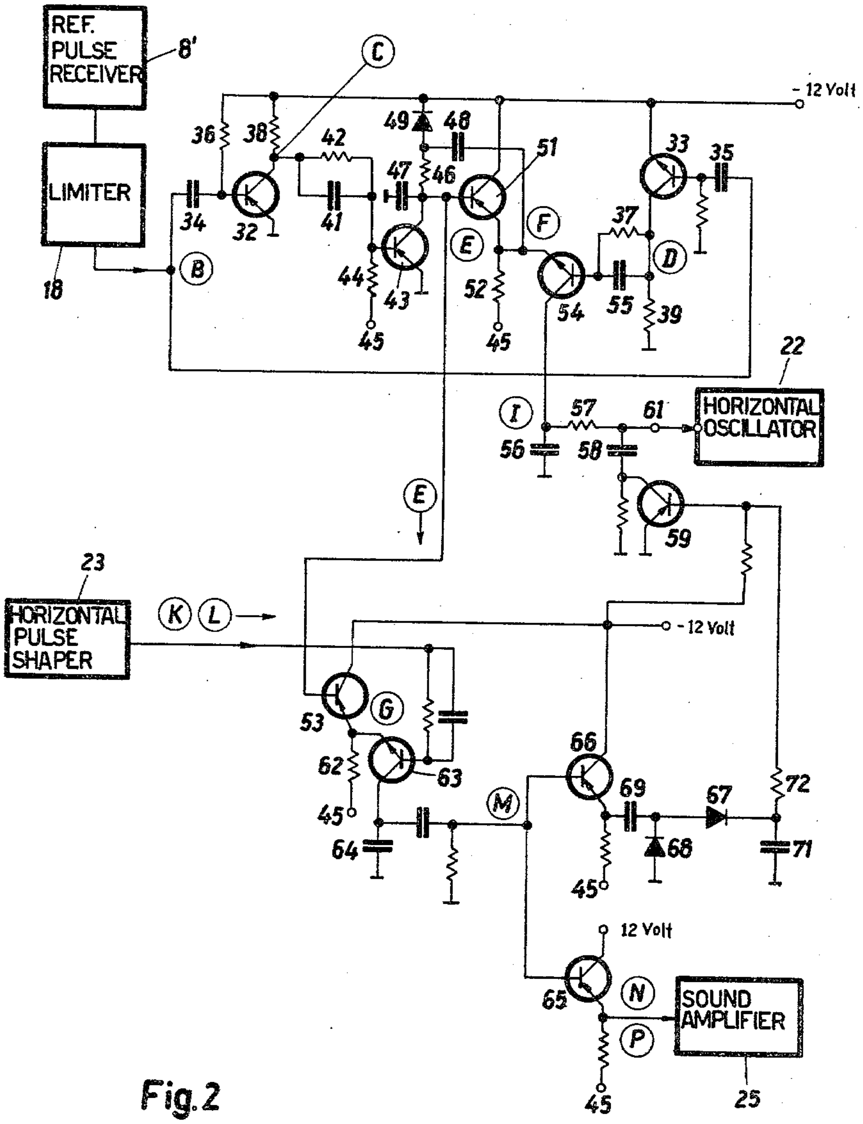

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawings in which:

FIGURE 1 shows a circuit arrangement for synchronizing a picture signal source at a remote position, FIGURE 2 shows a circuit arrangement for a pulse width demodulator and a phase demodulator employed in the circuit arrangement of FIGURE 1, and FIGURE 5 illustrates the waveforms of pulse trains arising in the circuit arrangement of FIGURE 2, In all these drawings corresponding elements are designated by the same reference numerals.

According to FIGURE 1 a master pulse generator 1 is located within a central position the bounds of which are indicated by broken line 2, whereas a picture signal source 3 is placed at a remote position of which the bounds are indicated by broken line 4. It is assumed that this remote position is separated from the central position 2 by a distance which is sufficiently great that the transit time of signals passing between the two positions must be taken into account. Such an arrangement is especially applicable where the central position is an outside-broadcast van and the remote position is a reportage camera.

At the central position 2 are located a phase modulator 5, a pulse-width modulator 6, and amplitude modulator 7, a reference pulse transmitter 8, a horizontal phase discriminator 9, and amplitude selector 10, a vision mixer 11 and a vision receiver 12. The vision mixer 11 is connected to the main transmitter 13, which may be outside the central position.

At the remote position 4 there are provided in addition to the picture signal source 3, an amplifier 14, an amplitude demodulator 15, a limiter 16, a vertical pulse shaping stage 17, a vision transmitter 12′, a reference pulse receiver 8′, a limiter 18, a pulse-width demodulator 19, a time-constant circuit 21 and a horizontal oscillator 22, a pulse shaper stage 23 for the horizontal pulse phase demodulator 24, sound amplifier 25, headset 26, electronic switch 27 and peak rectifier 28.

As far as the horizontal deflection is concerned the picture signal source is synchronized by a follow-up synchronizing system of the same kind as the so-called flywheel synchronizing system, while the vertical synchronization is effected by a direct synchronizing system. The follow-up synchronizing system consists essentially of the horizontal phase discriminator 9 (situated at the central position 2) and a horizontal frequency oscillator 22 controlled by it, which is situated at the remote position 4.

In the horizontal phase discriminator 9 the phase of the horizontal synchronizing pulses H′, which pass from the picture signal source 3 by way of the vision transmitter 12′ and the vision receiver 12, to the central position 2 and through the amplitude selector 10 to the discriminator 9, is compared with the phase of the horizontal pulses H which are applied to the discriminator from the master pulse generator 1. In this phase discriminator 9 a control voltage is derived depending on the phase-difference between the synchronizing pulses H′ and H.

The master pulse generator 1 generates a train of approximately symmetrical pulses recurrent at the horizontal frequency (reference pulses). These reference pulses are applied to a phase-modulator 5, in which they are modulated in phase by a sound signal received at terminal *k*, in order to transmit oral instructions to the picture source. The output of the phase modulator 5 is connected to the input of the pulse-width modulator 6, modulating the pulse-width of the reference pulses by the control voltage.

The output signal from pulse-width modulator 6 is then taken to amplitude-modulator 7 where the amplitude of the horizontal-frequency signal is increased by some 30% each time a vertical-frequency pulse V arrives from the master pulse generator 1. These modulated reference pulses are applied to the reference pulse transmitter 8 and are transmitted as a frequency-modulated carrier wave to the reference pulse receiver 8′ situated at the remote position.

At the remote position 4 there are the amplitude demodulator 15, the pulse-width demodulator 19 and the phase demodulator 24. To reduce the effects of transmission distortion the received reference pulses B (by the reference pulse receiver 8′) are applied to the limiter 18 and in this manner the signal applied to the pulse-width demodulator 19 and to the phase-demodulator 24 is kept substantially undistorted. These reference pulses are also applied to an amplifier 14 which is tuned to the horizontal frequency in order to effect a reduction of transmission distortion by band-width limiting. To obtain the accuracy necessary in a system employing interlaced scanning a push-pull amplitude demodulator (full-wave rectifier) is employed and the vertical frequency pulses obtained at the output of the amplitude demodulator 5 are applied by way of the limiter 16 to the vertical pulse shaper stage 17, in which are generated all the vertical pulses necessary for the picture signals source 3.

The horizontal pulses derived from the horizontal pulse shaper 23 are applied as reference signal to the phase demodulator since in the synchronized condition these horizontal pulses have a constant phase relation to the horizontal synchronizing pulses from the master pulse generator 1.

The phase-shift due to modulation by the sound signal is preferably made not greater than 5–15% of the length of a line. If the synchronism between the central position 2 and the remote position 4 is disturbed, the phase demodulator 24 provides an output signal 10 to 20 times larger and having a frequency equal to the difference between the horizontal frequency H of the master pulse generator 1 and the frequency H′ of the horizontal frequency oscillator 22 at the remote position 4. This difference in amplitude is made use of by employing the peak rectifier 28 for actuating the electronic switch 27 which alters the time-constant of the remote control voltage (applied to oscillator 22) from a large value in the synchronized condition to a relatively small value in the unsynchronized condition. Insensitivity to disturbance in the synchronized condition is thus combined with a wide pull-in range and rapid pull-in in the unsynchronized condition.

Figure 3:
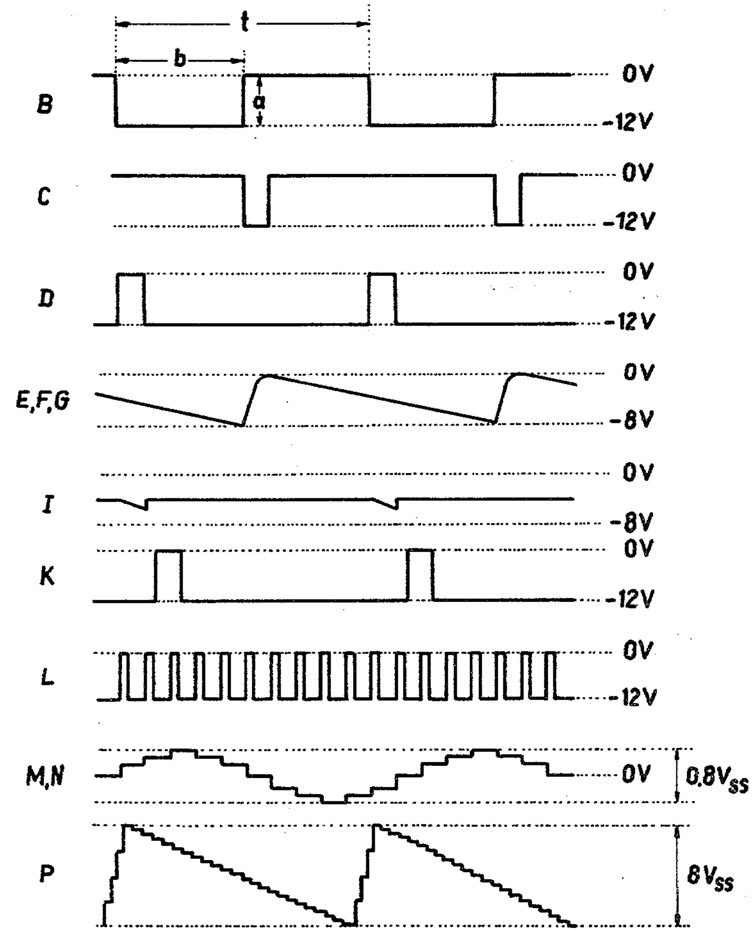

FIGURE 2 shows details of circuit arrangements of the pulse-width demodulator 19 and the phase demodulator 24 described in reference to FIGURE 1. The signal waveforms appearing in these circuits are illustrated in FIGURE 3. In the present case a pulse-width demodulator must be employed the output voltage of which follows the changes of the modulating control voltage as rapidly as possible and without hunting.

The train of reference pulses B received in the reference pulse receiver 8′ is composed of approximately symmetrical pulses of rectangular form, of which the width *b* is modulated by the control voltage and the amplitude *a* by the vertical synchronizing information. The distance *t* corresponds to the duration of one line. Pulse-width demodulation is effected according to the so-called "sampling" principle, in which there are derived from the reference signal B two series of auxiliary pulses, shown at C and D in FIGURE 3, the leading edges of which coincide respectively with the leading and trailing edges of the reference pulses B. From the train C of auxiliary pulses there is developed a signal E of sawtooth waveform, the phase of which is then compared with that of the other series of auxiliary pulses D, and in this manner there is obtained the remote control voltage for controlling the frequency of the horizontal frequency oscillator 22.

In particular the reference signal B is applied by way of limiter 18 to two pulse-shaping stages which consist of the transistors 32, 33, the capacitors 34, 35 and the resistors 36, 37, 38 and 39.

Corresponding to the leading edges of the reference pulses B applied by way of capacitor 34 to the base of transistor 32 negative-going pulses C, arise at the collector of this transistor 32. The width of these impulse C corresponds to about 1/10 of the width *b* of the horizontal synchronizing pulses. The transistor 33, which is of the npn type, is thus of the conductivity type opposite to that of transistor 32, so that it develops corresponding to the trailing edges of the reference pulses B applied to its base by way of capacitor 35 a positive-going pulse train D, the width of these pulses likewise corresponding to 1/10 of the width of the horizontal synchronizing pulses. The pulse train C is applied by way of capacitor 41 (100 pf.), which is shunted by resistor 42 (33 kilohms) to the base of transistor 43. The base of this transistor is connected by way of a resistor 44 (270 kilohms) and via the terminal 45 with a positive voltage source (+12 v.). By means of a bootstrap charging circuit comprising a transistor 43, a resistor 46 (12 kilohms), capacitors 47 (5 nf.) and 48 (0.5 μf.) and a diode 49 a sawtooth voltage is generated and applied on the one hand to the base of a transistor 51, which is connected as an impedance converter by reason of a resistor 52 (6.8 kilohms) in its base lead, and on the other hand to the base of another transistor 53. The output signal F from transistor 51 is thus on the one hand fed back through capacitor 48 to linearize the charging of capacitor 47 and on the other hand is applied to the emitter of transistor 54 which is connected as a switching transistor. This transistor 54 is controlled by the pulse train D so that it is conductive for the duration of each pulse of train D and the capacitor 56 (10 nf.) in its collector circuit then charges rapidly to the instantaneous emitter potential, that is, to the instantaneous value of the sawtooth voltage E during the presence of pulse D. The signal I thus results on capacitor 56. If the width of the rectangular reference pulses B alters, then the phase of the pulses D also alters in relation to the sawtooth signal F and thus the potential transmitted through transistor 54 to capacitor 56 also alters. The subsequent time-constant circuit, consisting of a resistor 57 (10 kilohms) and a capacitor 58 (6 μf.) with a relatively large time-constant is effective only when transistor 59 is conductive. It is arranged that this transistor is conductive only in the synchronized condition of the circuit. The remote control voltage thus developed is applied by way of a terminal 61 to the horizontal frequency oscillator 22. Transistor 54 is thus an element of a so-called sampling circuit. In this connexion it is important that transistors 51 and 54 shall be of opposite conductivity types, since otherwise the transistor 51 might be blocked during the operation of the circuit.

The sampling principle is made use of in the phase demodulator also. The phase of the reference pulses B is modulated by the sound signal with a deviation of about 1/10 of the duration of one line. As already explained, the sawtooth signal E is applied to the transistor 53, which is connected as an impedance converter by reason of the resistor 62 (6.8 kilohms) in its emitter lead. The output signal from transistor 53 is applied to the emitter of another transistor 63, which is connected as a switching transistor. This transistor is controlled by the horizontal synchronizing pulses K or L from the horizontal pulse-shaping stage 23, so that it becomes conductive during these pulses and the capacitor 64 (10 nf.) in its collector circuit is rapidly charged to the instantaneous value of the sawtooth voltage G applied to its emitter, this action being completed during the application of the pulse to its base. In FIGURE 3 the pulse trains K, L, M and N are shown at a time-scale which is one-tenth of that used for the preceding waveforms.

At synchronism the pulses K or L have a constant phase, compared with that of the sawtooth voltage G which is fluctuating in rhythm with the sound modulation. The potential on capacitor 64 thus alters in staircase form in accordance with the sound modulation (pulse train M), the distance between steps being equal to the line duration. This pulse train M is applied on the one hand by way of the impedance converter formed by transistor 65 to the sound amplifier 25, and on the other hand by way of the impedance converter formed by transistor 66 to a peak rectifier circuit including diodes 67, 68, capacitors 69 (6 $\mu$f.), 71 (1 $\mu$f.) and resistor 72 (1.2 kilohms). When the output voltage from this peak rectifier exceeds a predetermined value it cuts off transistor 59, which operates as a time-constant switch. In the synchronized condition this predetermined value of voltage is not reached. In the unsynchronized condition there appears on the capacitor 64 a voltage some ten times as large as that appearing in the synchronized condition, this increased voltage being of the same amplitude as the peak amplitude of the sawtooth voltage G. Transistor 59 is thus cut off and the large time-constant produced by resistor 57 and capacitor 58 becomes inoperative.

Pulse train N, which is of a form similar to that of train M, illustrates a sound signal of some 1.5 kc./s. which appears in the demodulator in the synchronized condition. The peak-to-peak voltage of this signal amounts to 0.8 v. The signal P illustrates the same sound signal in the unsynchronized condition, based upon a somewhat reduced time-scale. Here the peak-to-peak amplitude of the signal amounts to 8 v.

While the invention has been illustrated and described as embodied in a television transmitting apparatus using rectangular reference pulses, it is not intended to be limited to the details shown, since various modifications and structural changes may be made without departing in any way from the spirit of the present invention.

What is claimed as new and desired to be secured by Letters Patent is:

1. A television apparatus comprising, in combination, a master pulse generator with a horizontal synchronizing pulse generator and a vertical synchronizing pulse generator all situated at a central position; a phase discriminator measuring the phase difference of two signals applied to its two inputs and generating a control voltage at its output, said control voltage depending on said phase difference; a picture signal source situated at a remote position; a reference pulse generator generating rectangular reference pulses; a reference pulse transmitter transmitting said reference pulses from said central position to said remote position; a reference pulse receiver receiving said reference pulses at said remote position; means for synchronizing said picture signal source with said received reference pulses; a vision transmiter transmitting said picture signal to said central position; a vision receiver receiving said picture signal; a horizontal frequency separator splitting off the horizontal frequency pulses from said picture signal; a reference pulse modulator modulating the width of said reference pulses in accordance with said control voltage, further modulating the amplitude of said reference pulses by an information relating to the vertical synchronisation and still further modulating the phase of said reference pulses in accordance with sound signals to be transmitted from said central position to said remote position; connection means connecting one of said inputs of the phase discriminator with said horizontal synchronizing pulse generator; further connection means connecting the other input of said phase discriminator with the output of said horizontal frequency separator; additional connection means connecting the output of said phase discriminator with one input of said reference pulse modulator; and still further connection means connecting said vertical synchronizing pulse generator with another input of said reference pulse modulator.

2. Apparatus as claimed in claim 1, comprising, in combination, a carrier wave generator transmitting said reference pulses from said central to said remote, position; a carrier wave modulator; and connection means connecting said reference pulse modulator with said carrier wave modulator.

3. A television apparatus comprising, in combination, a master pulse generator with a horizontal synchronizing pulse generator and a vertical synchronizing pulse generator all situated at a central position; a phase discriminator measuring the phase difference of two signals applied to its two inputs and generating a control voltage at its output, said control voltage depending on said phase difference; a picture signal source situated at a remote position; a reference pulse generator generating rectangular reference pulses; a reference pulse transmitter transmitting said reference pulses from said central position to said remote position; a reference pulse receiver receiving said reference pulses at said remote position; means for synchronizing said picture signal source with said received reference pulses; a vision transmitter transmitting said picture signal to said central position; a vision receiver receiving said picture signal; a horizontal frequency separator splitting off the horizontal frequency pulses from said picture signal; a reference pulse modulator modulating the width of said reference pulses in accordance with said control voltage, further modulating the amplitude of said reference pulses by an information relating to the vertical synchronisation and still further modulating the phase of said reference pulses in accordance with sound signals to be transmitted from said central position to said remote position; connection means connecting one of said inputs of the phase discriminator with said horizontal synchronizing pulse generator; further connection means connecting the other input of said phase discriminator with the output of said horizontal frequency separator; additional connection means connecting the output of said phase discriminator with one input of said reference pulse modulator; and still further connection means connecting said vertical synchronizing pulse generator with another input of said reference pulse modulator; a first pulse shaping circuit with one input and one output shaping a first train of relatively brief rectangular pulses, the leading edges of which coincide with the leading edges of said reference pulses; a second pulse-shaping circuit with one input and one output shaping a second train of relatively brief rectangular pulses the leading edges of which coincide with the trailing edges of said reference pulses; connection means connecting said reference pulse receiver with said inputs of the first and second pulse-shaping circuits.

4. Apparatus as claimed in claim 3, comprising, in a combination, a sawtooth generator generating a sawtooth voltage of like repetition rate as those of said trains of relatively brief pulses of one of said pulse shaping circuits; a second phase discriminator measuring the phase difference of two signals applied to its inputs and generating a remote control voltage at its output, said remote control voltage depending on said phase difference; an oscillator generating the horizontal frequency for said picture signal source; connection means connecting one input of said phase discriminator with the output of said sawtooth generator; further connection means connecting the other input of said second phase discriminator with the other of said pulse shaping circuits; still further connection means connecting the output of said second phase discriminator with said oscillator in order to control the frequency of said oscillator with said remote control voltage.

5. Apparatus as claimed in claim 3, comprising, in combination, a sound amplifier; a sawtooth generator generating a sawtooth voltage of repetition rate of those relatively brief pulses of one of said pulse shaping circuits; a third phase discriminator measuring the phase difference of two signals applied to its inputs and generating a sound control voltage at its output, said sound control voltage depending on said phase difference; a horizontal pulse shaping stage shaping the horizontal synchronizing pulses for said picture signal source; connection means connecting one input of said third phase discriminator with the output of said sawtooth generator; further connection means connecting the other input of said third phase discriminator with one output of said horizontal pulse shaping stage and still further connection means connecting the output of said third phase discriminator with said sound amplifier.

6. Second phase discriminator according to claim 4 comprising, in combination, a transistor; a capacitor; connection means connecting the output of said sawtooth generator with the emitter-collector path of said transistor; means connecting said emitter-collector path with said capacitor; means connecting the other of said pulse shaping circuits with the base of said transistor in order to vary the state of conduction of said transistor so that it can pass current only for the duration of each of said pulses and means connecting one plate of said capacitor with said oscillator to control the frequency of said oscillator.

7. Apparatus according to claim 4 comprising, in combination, a time constant circuit; means for altering the time constant of said circuit from a relatively large value when said apparatus is in the synchronized condition to a relatively small value whein said apparatus is in the unsynchronized condition.

8. Third phase discriminator according to claim 5 comprising, in combination, a transistor; a capacitor; connection means connecting the output of said sawtooth generator with the emitter-collector path of said transistor; means connecting said emitter-collector path with said capacitor; means connecting said horizontal pulse shaping stage with the base of said transistor in order to vary the state of conduction of said transistor so that it can pass current only for the duration of each of said pulses and means connecting one plate of said capacitor with said sound amplifier.

9. Means for altering the time constant of said time constant circuit according to claim 7, comprising, in combination, a transistor; a peak rectifier; connection means connecting the output of said third phase discriminator with the input of said peak rectifier; means connecting the output of said peak rectifier with the base of said transistor; and means connecting said time constant circuit with the emitter-collector path of said transistor.

10. Modulator according to claim 1 comprising means for preventing phase deviations above 10% of the duration of one line of the modulated reference pulses.

11. A television apparatus comprising, in combination, a master pulse generator including a horizontal synchronizing pulse genrator and a vertical synchronizing pulse generator all situated at a central position and generating rectangular reference pulses; a phase discriminator measuring the phase difference between two signals applied to its two inputs and generating a first control voltage at its output, said first control voltage depending on said phase difference; a reference pulse modulator modulating said reference pulses by said first control voltage; connection means connecting one of said inputs of said phase discriminator with said horizontal synchronizing pulse generator; additional connection means connecting the output of said phase discriminator with the input of said reference pulse modulator; a picture signal source situated at a remote position; means for synchronizing said picture signal source depending upon a further control voltage; a reference pulse transmitter transmitting said modulated reference pulses from said central position to said remote position; a reference pulse receiver receiving modulated reference pulses at said remote position; demodulator means situated at said remote position and demodulating said reference pulses and generating said further control voltage similar to said first control voltage; a vision transmitter transmitting said picture signal to said central position; a vision receiver receiving said picture signal; a horizontal frequency separator splitting off the horizontal frequency pulses from said picture signal; further connection means connecting the other input of said phase discriminator with the output of said horizontal frequency separator; and still further connection means connecting the output of said demodulator means with said means for synchronizing said picture signal source.

References Cited by the Examiner

UNITED STATES PATENTS

| | | | |
|---|---|---|---|
| 2,570,775 | 10/51 | De Baum | 178—69.5 |
| 2,704,307 | 3/55 | Gillette et al. | 178—69.5 |

DAVID G. REDINBAUGH, *Primary Examiner.*